May 22, 1956 T. C. HOAD 2,746,691
FILM TAKE-UP
Filed Dec. 13, 1951
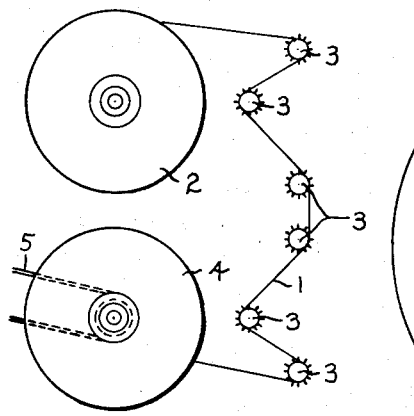
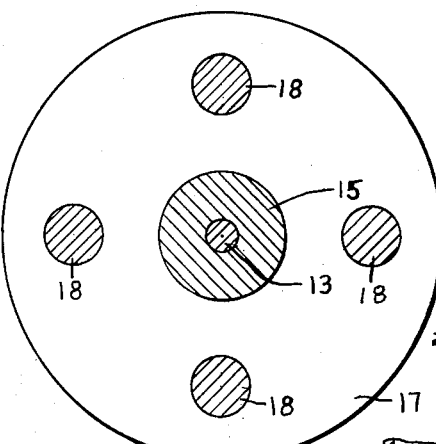
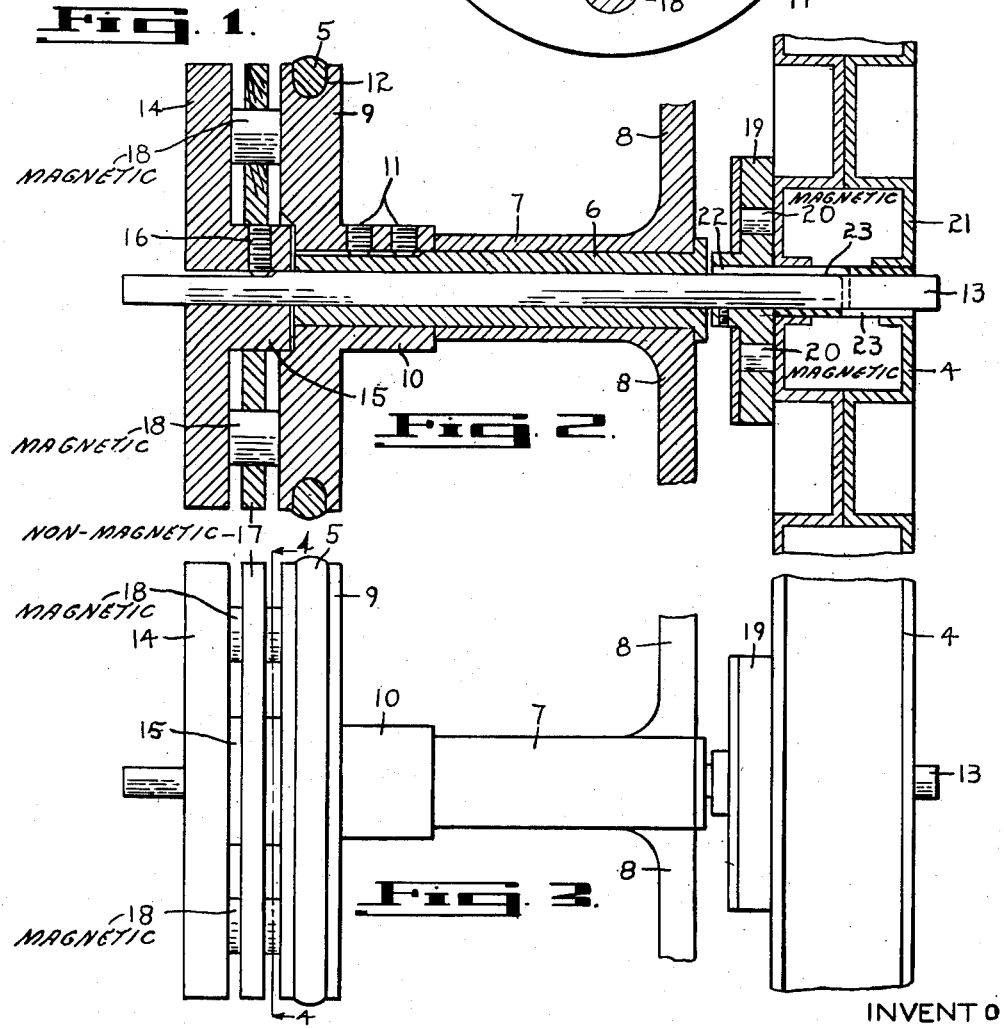
INVENTOR
THOMAS C. HOAD
by Douglas S. Johnson
atty.

United States Patent Office 2,746,691
Patented May 22, 1956

2,746,691
FILM TAKE-UP
Thomas C. Hoad, Toronto, Ontario, Canada
Application December 13, 1951, Serial No. 261,551
6 Claims. (Cl. 242—55)

This invention relates to film take-up such as used in the actual projectors or in film winding equipment.

In the take-up of film, for instance, in moving projector equipment, the film drawn through the projector at a uniform rate is wound on a reel which must be held on its drive shaft ready for quick removal, and the drive to the shaft must be such as to allow the speed of the reel to decrease as the reel becomes full to accommodate the increasing diameter of the film. Also the tension on the film when being wound must not be such as to wind it too tightly for it comes off the projector quite hot and on cooling, after being wound, contracts. If the reel is too tightly wound film damage occurs.

In the conventional film take-ups in order to drive the take-up reel near the end of the winding with the reel carrying substantially the full weight of the film an appreciable torque is required, and this torque when the reel is running light at the beginning of the winding places a dangerous tension on the film, resulting in frequent film breakage and tearing of the perforations in the film by the teeth of the hold-back sprocket.

Attempts have been made to provide a variable torque take-up but the resulting structures have been relatively complex and expensive requiring careful maintenance.

The principal object of this invention is to provide an improved take-up which will eliminate any dangerous tension on the film yet will insure extremely smooth and positive take-up throughout the entire winding operation.

A further important object is to provide a simple and extremely reliable take-up in which there will be no moving parts to get out of order or become deleteriously effected by dust, dirt, or other conditions to which such take-ups are subject.

Still a further object is to facilitate the placing of the reel on the take-up and its removal therefrom.

The principal feature of the invention resides in coupling the driving member to the driven member of the take-up by means of a magnetic coupling limiting tension on the film being reeled in to an acceptable value throughout the entire winding operation.

A further important feature resides in combining with the magnetic coupling a friction coupling providing a variable factor in the drive to increase the torque transmitted to the take-up reel to accommodate the weight of the film as the reel loads up.

Still a further feature resides in magnetically holding the take-up reel on the driven shaft of the take-up.

More particularly, the invention resides in interposing one or more magnets between a disc mounted on the take-up shaft carrying the winding reel and a concentric driving disc, the magnetic flux linking the discs and acting to lock same together to rotate the take-up shaft but affording relative movement between the discs when the torque being transmitted reaches the maximum permissible value.

These and other objects and features will become apparent from the following description taken in conjunction with the accompanying drawings in which Figure 1 is a diagrammatic view illustrating the application of the film take-up mechanism.

Figure 2 is a longitudinal mid-vertical sectional detail partly broken away of an improved take-up according to the invention.

Figure 3 is an elevational view of the device of Figure 2.

Figure 4 is a section on the line 4—4 of Figure 2.

Referring to Figure 1, the film 1 is shown being drawn off a reel 2 by means of sprockets 3 which represent, for instance, the sprocket system of a moving projector in which some of the sprockets are positively driven and some constitute idler sprockets, the last sprocket constituting the hold-back sprocket.

The take-up reel 4 is shown as driven from a belt 5 to take up the film being wound off the sprockets. The drive between belt 5 and take-up reel is depicted in Figures 2 to 4 and includes a journal or sleeve 6 rotatably mounted in a fixed journal 7 carried by suitable supports 8.

Mounted on one end of the sleeve 6 is an annular disc 9 having a hub 10 secured to the sleeve by the set screws 11.

The belt 5 engages in a groove 12 in the periphery of the disc 9.

Mounted to rotate in the sleeve 6 is a shaft 13 on which the take-up reel 4 is adapted to be mounted. Carried on this shaft is an annular disc 14 having a hub 15 through which the set screw 16 extends to lock the disc to the shaft.

Both of the discs 9 and 14 are of magnetically susceptible material and loosely mounted on the hub 15 of disc 14 is a third annular disc 17 of non-magnetic material.

Mounted loosely in openings in the disc 17 are one or more magnets 18 arranged with their opposing poles adapted to contact the opposing discs 9 and 14.

Mounted on the shaft 13 at the opposite end of the sleeve 6 from the disc 9 is an annular mounting 19 which carries one or more magnets 20 to magnetically link with the hub 21 of the reel 4. The shaft 13 also carries a key 22 engaging in a corresponding key-way 23 in the reel hub 21.

In operation the take-up reel 4 is introduced on to the end of shaft 13, the key 22 locks the reel to rotate with the shaft and the magnets 20 firmly hold the reel against movement outwardly therefrom yet permit the instant replacement and interchangement of the take-up reel under an external force sufficient to overcome the magnetic attraction.

As the film is first being taken up there will be a relatively light load on the shaft 13 and consequently relatively light frictional force between the positively driven sleeve 6 and the shaft. There will however be a magnetic linkage coupling the positively driven disc 9 fixed to the sleeve and the disc 14 fixed to the shaft through the magnetic fields created by the magnets 18.

These magnets serve to draw the disc 14 towards disc 9 to set up secondarily to the magnetic linkage between these discs a frictional coupling, assisting in the transfer of the torque from the disc 14 to the disc 9.

The size and number of the magnets 18 are chosen to limit this torque transfer to limit tension on the film with the reel 4 substantially empty at the beginning of the take-up to a value within the strength of the film, for instance a two-ounce pull on the film has been found to be acceptable.

As the take-up reel loads up with the film and the weight on the shaft 13 is thereby increased the frictional force between the shaft and the positively driven sleeve 6 is correspondingly increased, thereby providing an increase in the torque transfer between the driving and the driven members of the take-up. The result is that even though the torque transfer through the magnetic coupling (and the secondary friction coupling afforded through the magnets 18) remains substantially uniform throughout the takeup, this coupling combined with the frictional coupling between the driving sleeve 6 and the shaft 13 provides an increasing torque, maintaining substantially uniform tension on the film from the beginning of the take up to the end, or affording a means of increasing the pull if found necessary.

In addition to the factor of increasing load on the shaft 13 as the take-up reel is filled there must be greater slippage between the driving and driven parts of the take-up due to the fact that the diameter of the film roll is increasing. The coupling resists this increase in slip, again increasing the torque transfer, which increase again corresponds to the increase in the load on the shaft 13.

While the magnets 18 may be fixed to one of the discs 9 or 14, in practice more uniform results are obtained by having the magnets mounted on the loose disc 17, as illustrated in Figure 2. In operation the magnets are found to anchor themselves to one of the discs 9 and 14 and to rotate with that disc while frictionally wiping over the face of the opposing disc. Then upon the magnets striking a variation in the uniformity in the disc surface over which it is passing, or through some other anomaly, the magnets will switch to the opposite disc adhering thereto and revolving therewith while wiping over the first disc to which they were attached. This action appears to iron out the torque transfer to provide a smooth take-up, and provides a continual lapping action to smooth the disc surfaces.

In practice the choice of the size of the shaft 13, the length of the sleeve 6, and the strength and number of the magnets 18 determine the actual torque transfer characteristic of the take-up, and the torque transfer may be such as to allow the tension on the film being taken up to decay slightly as the reel is wound so that the film will not be too tightly wound on the reel and give rise to problems of shrinkage which occur when the film is wound off a projector and is hot, and if the reel is too tightly wound the film on shrinking may become damaged.

It will be understood that a magnetic coupling in accordance with the invention may be embodied in a take-up while varying from the particular structure disclosed herein, and it will be understood that such variations may be made without departing from the scope of the appended claims.

What I claim as my invention is:

1. In a film take-up, a shaft on which a take-up reel is adapted to be mounted, a magnetically susceptible disc mounted on said shaft, a magnetically susceptible positively driven member coaxial with said disc, and at least one magnetic friction element mounted to rotate about the axis of said shaft independently of shaft rotation in contact with and forming a magnetic link between said disc and said positively driven member to provide through a combination of frictional and magnetic forces a torque transfer therebetween limited to provide a permissible tension on a film being taken up by a reel mounted on said shaft.

2. In a film take-up, a shaft on which a take-up reel is adapted to be mounted, a driving means for driving said shaft, a friction coupling between said driving means and shaft adapted to provide an increasing torque transfer therebetween upon loading of said shaft under weight of a film being taken up on a take-up reel mounted on said shaft, and a coupling comprising at least one magnetic element magnetically coupling and forming a frictional connection between said driving means and shaft to provide a torque transfer therebetween limited to provide a permissible tension on a film being taken up, said magnetic element being loosely mounted on and rotatable independently of said shaft and driving means.

3. In a film take-up, a rotatable journal mounted in a fixed journal, means positively driving said rotatable journal, a shaft on which a take-up reel is adapted to be mounted journalled in said rotatable journal and axially shiftable therein and a coupling between said rotatable journal and said shaft to provide a torque transfer therebetween limited to provide a permissible tension on a film being taken up on a take-up reel mounted on said shaft, said coupling comprising an annular magnetically susceptible disc mounted on and fixed to said shaft, an annular magnetically susceptible disc mounted on and fixed to said rotatable journal, and at least one magnetic element mounted to rotate about the axis of said shaft independently of shaft rotation extending between and in frictional contact with and forming a magnetic link between said discs, said magnetic element attracting said discs to apply compressive force on opposite faces of said magnetic element proportional to the magnetic strength of said element.

4. In a film take-up, a fixed journal, a rotatable journal mounted in said fixed journal, means positively driving said rotatable journal, a shaft on which a take-up reel is adapted to be mounted journalled in said rotatable journal and axially shiftable therein, a magnetically susceptible disc mounted on and fixed to said rotatable journal, a magnetically susceptible disc mounted on and fixed to said shaft, and at least one magnetic element mounted between said discs to rotate independently of said shaft and rotatable journal and having opposing faces in contact with and magnetically linking said discs to provide through magnetic and frictional forces limited torque transfer therebetween, said magnetic element attracting said discs to apply a compressive force on opposite faces of said magnetic element proportional to the magnetic strength of said element.

5. In a film take-up, a fixed journal, a longitudinal sleeve journalled in said fixed journal and having an annular disc secured thereto at one end thereof, a shaft mounted in said sleeve and axially shiftable therein and having mounted thereon at one end of said sleeve an annular disc opposing said sleeve disc, and at the other end of said sleeve means for mounting a take-up reel thereon, at least one of said discs being of magnetically susceptible material, and at least one magnetic element mounted to rotate about the axis of said shaft independently of shaft rotation interposed between said discs in contact with said magnetically susceptible disc and urged to follow movement of the other disc, said magnetic element frictionally and magnetically coupling said discs for a limited torque transfer therebetween, said magnetic element attracting said magnetically susceptible disc to apply a compressive force on said element proportional to the magnetic strength of said element.

6. In a film take-up, a fixed journal, a longitudinal sleeve journalled in said fixed journal and having a magnetically susceptible disc secured thereto at one end thereof, a shaft rotatably and slidably mounted in said sleeve and having secured thereto at one end of said sleeve a magnetically susceptible disc opposing said sleeve disc and at the other end of said sleeve means for releasably mounting a take-up reel thereon, a disc loosely mounted to rotate about the axis of said shaft independently of shaft rotation arranged between the aforesaid discs and at least one magnet carried by said latter disc and contacting opposing faces of the aforesaid discs to move on said faces while magnetically coupling the aforesaid discs for limited torque transfer therebetween, said magnetic element attracting said discs to apply a compressive force on said magnetic element proportional to the magnetic strength of said element.

References Cited in the file of this patent

UNITED STATES PATENTS

| | | |
|---|---|---|
| 1,377,112 | Boylan | May 3, 1921 |
| 2,147,204 | Laird | Feb. 14, 1939 |
| 2,364,148 | Kellogg | Dec. 5, 1944 |
| 2,365,691 | Fodor | Dec. 26, 1944 |
| 2,646,145 | Durston | July 21, 1953 |